United States Patent
Murphy et al.

(12) 
(10) Patent No.: US 6,690,721 B1
(45) Date of Patent: Feb. 10, 2004

(54) METHOD FOR ASYMMETRIC DIGITAL SUBSCRIBER LINE MODEM RECOVERY FROM INSUFFICIENT TRANSMIT POWER

(75) Inventors: Tim Murphy, Ramona, CA (US); Martin Staszak, Poway, CA (US); Richard Williams, San Diego, CA (US)

(73) Assignee: 3Com Corporation, Marlborough, MA (US)

( * ) Notice: Subject to any disclaimer, the term of this patent is extended or adjusted under 35 U.S.C. 154(b) by 665 days.

(21) Appl. No.: 09/598,618

(22) Filed: Jun. 21, 2000

Related U.S. Application Data
(60) Provisional application No. 60/175,057, filed on Jan. 7, 2000.

(51) Int. Cl.[7] .............................. H04B 1/38; H04L 5/16
(52) U.S. Cl. .................... 375/222; 375/257; 370/252
(58) Field of Search .......................... 375/219, 220, 375/221, 222, 257; 379/93.01, 134, 140; 370/485, 252, 493

(56) References Cited

U.S. PATENT DOCUMENTS

| | | | | |
|---|---|---|---|---|
| 6,111,936 A | * | 8/2000 | Bremer | 379/28 |
| 6,154,524 A | * | 11/2000 | Bremer | 379/10.03 |
| 6,266,348 B1 | * | 7/2001 | Gross et al. | 370/493 |
| 6,356,585 B1 | * | 3/2002 | Ko et al. | 375/222 |
| 6,456,650 B1 | * | 9/2002 | Cheng et al. | 375/222 |
| 6,549,568 B1 | * | 4/2003 | Bingel | 375/222 |
| 2001/0031048 A1 | * | 10/2001 | Payne et al. | 379/390.04 |

OTHER PUBLICATIONS

ITU–Telecommunication Standardization Sector, Jan. 18–22, 1999, Draft Recommendation G.992.2, pp. 1–152.
ITU–Telecommunication Standardization Sector, Oct. 12–23, 1998, G.994.1 Draft Document, pp. 1–35.
Tampere University of Technology Telecommunication Laboratory, Feb. 17, 1995, ADSL, pp. 1–20.
ITU–T Recommendation G.992.2 (06/99)—Splitterless asymmetric digital subscriber line (ADSL) transceivers.
ITU–T Recommendation G.994.1 (06/99)—Handshake procedures for digital subscriber line (DSL) transceivers.

* cited by examiner

*Primary Examiner*—Phoung Phu
(74) *Attorney, Agent, or Firm*—McDonnell Boehnen Hulbert & Berghoff

(57) ABSTRACT

A method for recovering from an excessive power cutback in a splitterless asymmetric digital subscriber line modem. The modem may apply a power cutback to enable simultaneous use of the modem and a telephone. The modem determines if the modem's power after the cutback is sufficient to support data communication with the central office. If the power is insufficient, the modem gradually reduces the power cutback, checks the sufficiency of the power again, and repeats this cycle. The modem repeats the cycle until the modem attains an acceptable transmit power where the power requirements for data transfer and noise reduction are balanced.

9 Claims, 7 Drawing Sheets

METHOD FOR ASYMMETRIC DIGITAL SUBSCRIBER LINE MODEM RECOVERY FROM INSUFFICIENT TRANSMIT POWER

REFERENCE TO RELATED APPLICATIONS

This application claims the benefit of U.S. Provisional Application Serial No. 60/175,057 titled "Method for Asymmetric Digital Subscriber Line Modem Recovery from Insufficient Transmit Power," naming the same inventors, filed on Jan. 7, 2000, claiming priority benefits under 35 U.S.C. §119(e).

FIELD OF INVENTION

The present invention relates to communications in digital subscriber lines. More specifically, it relates to a method for a splitterless asymmetric digital subscriber line modem to recover from insufficient transmit power.

BACKGROUND OF THE INVENTION

Digital Subscriber Line ("DSL") is a developing modem technology that allows existing copper telephone lines to carry high bandwidth information. Familiar twisted-pair telephone lines are then able to carry high speed data communication to and from a customer site in addition to retaining a plain old telephone service ("POTS") channel for voice communication. At the customer site, a DSL modem receives the downstream signal representing data for a customer from a central office for a telephone company and transmits upstream signal representing data from the customer to the central office.

One configuration of DSL is generally termed Asymmetric Digital Subscriber Line ("ADSL"). ADSL allows high-speed data transport to the customer site but only medium-speed data transfer from the customer site, whence the asymmetry. ADSL also allows the simultaneous use of the ADSL modem and POTS on the same telephone line. In this configuration, at a point where the twisted-pair telephone line enters the customer site, the POTS channel is split off from the ADSL modem by filters. One problem with this ADSL, however, is that a technician from the telephone company has to visit the customer site and install the splitter, referred to as "the truck roll."

To overcome this problem, another configuration of ADSL forgoes the requirement of a splitter at the customer site. This configuration is generally called "splitterless ADSL" and also goes under the name of "G.Lite." Splitterless ADSL is described in the International Telecommunications Union-Telecommunication Standardization Sector ("ITU-T", formerly known as the CCITT) Recommendation G.992.2, which is incorporated herein by reference. ITU-T standards can be found on the World Wide Web at the Universal Resource Locator ("URL") "www.itu.ch." Splitterless ADSL modems include those manufactured by 3Com Corporation of Santa Clara, Calif., Lucent Technologies of Murray Hill, N.J., Texas Instruments of Dallas, Tex., and others.

In splitterless ADSL, an ADSL modem directly shares the same twisted-pair telephone line as a POTS telephone without the intervention of a splitter. Sharing the same twisted-pair telephone line, however, may result in some of the ADSL signal bleeding over into the audible frequency range of the POTS telephone. Audible noise effects, such as a buzzing in the earpiece or speaker, are heard on the POTS telephone when off-hook. The noise effect is the response of the internal circuitry of the telephone to the ADSL signal. The noise may be reduced by cutting back on the transmitted power of the ADSL modem. A method for reducing noise from an ADSL modem is described in U.S. patent application Ser. No. 09/458,568, assigned to the 3Com Corporation of Santa Clara, Calif., which is fully incorporated herein by reference.

The power cutback for reducing audible noise, however, may result in insufficient power for data transfer. It is desirable, therefore, to provide a method for an ADSL modem to recover from a power cutback that is too large to support data transfer. This may allow customers to continue using the ADSL modem to transfer data while they are also using the telephone, albeit with possibly degraded audio quality.

SUMMARY OF THE INVENTION

In accordance with preferred embodiments of the present invention, some of the problems associated with imposing a power cutback in a splitterless ADSL modem are overcome. The modem implements the power cutback to enable simultaneous use of a telephone and the modem. One aspect of the invention includes a method for recovering from a power cutback that limits transmitted power from the modem and prevents communication between the modem and a central office. The method includes determining whether the transmitted power from the modem after a previous power cutback is sufficient to establish communication between the modem and the central office. If the transmitted power from the modem is not sufficient to establish communication, the modem reduces the previous power cutback by a step value to obtain a new power cutback. The new power cutback is applied to the modem to obtain a new transmitted power. The modem repeats the above steps until the new transmitted power after the new power cutback is sufficient to establish communication between the modem and the central office.

For example, the method of the present invention may provide for a reduction of audible noise in the telephone from a G.Lite modem while, at the same time, maintaining communication between the modem and the central office. The method described herein may allow customers to use their telephones while the G.Lite modem is simultaneously transferring data.

The foregoing and other features and advantages of preferred embodiments of the present invention will be more readily apparent from the following detailed description, which proceeds with reference to the accompanying drawings.

BRIEF DESCRIPTION OF THE DRAWINGS

Preferred embodiments of the present invention are described with reference to the following drawings, wherein.

APPENDIX

The attached appendix includes computer source code for implementing the preferred embodiments described herein.

DETAILED DESCRIPTION OF PREFERRED EMBODIMENTS

Figure 1:
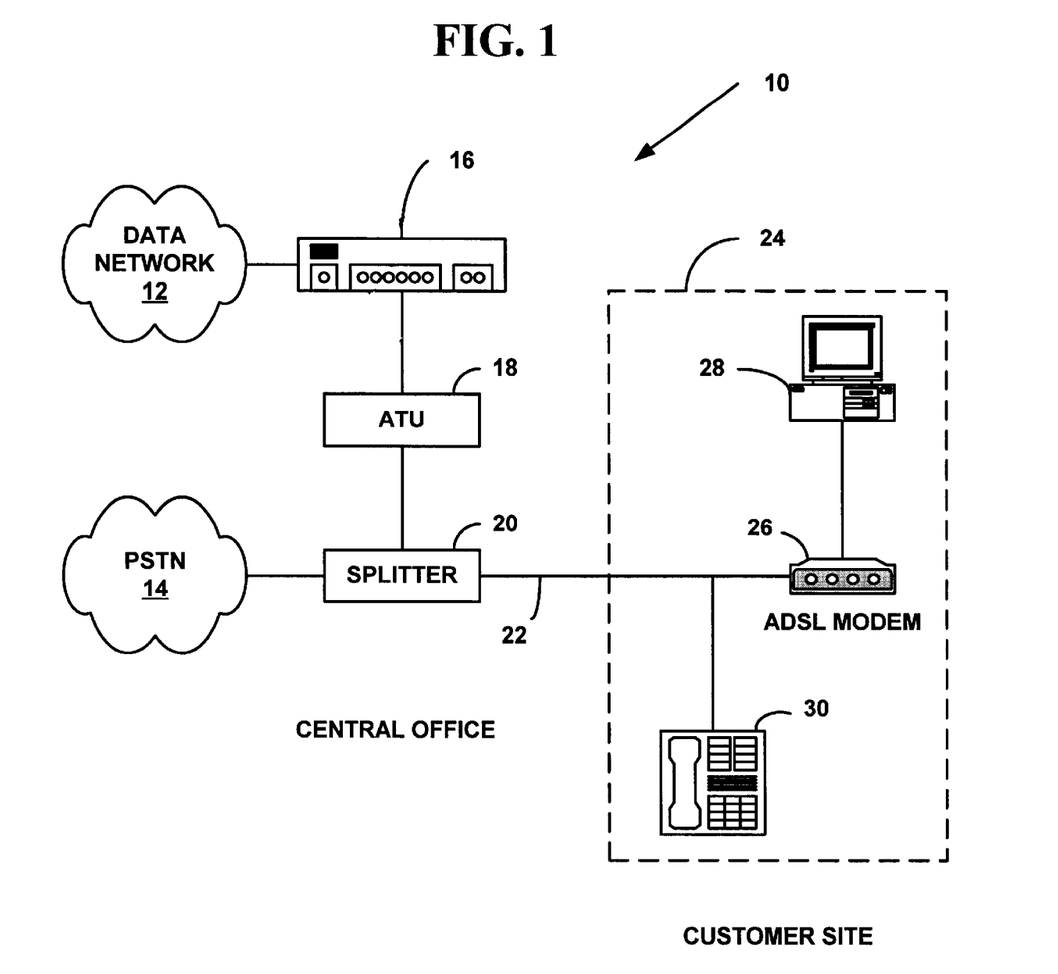
FIG. 1 is a block diagram illustrating a splitterless ADSL system.

FIG. 1 is a block diagram illustrating a splitterless ADSL system 10. The system 10 allows digital communications from a data network 12 and analog telephone signals from a Public Switched Telephone Network 14 ("PSTN") to be combined and sent to a customer site 24 over a customer loop 22 comprising twisted-pair copper wire. The PSTN 14 includes those public switched telephone networks provided by AT&T, Regional Bell Operating Companies (e.g., Ameritech, U.S. West, Bell Atlantic, Southern Bell Communications, Bell South, NYNEX, and Pacific Telesis Group), GTE, and others.

The digital data communications are received by a concentrator 16, which is typically located at a telephone company's central office ("CO"). The data network 12 may be a local area network ("LAN"), a wide area network ("WAN"), or combination of the foregoing. For example, data network 12 may be the Internet and the concentrator 16 may be a network hub that receives Internet Protocol packets and routes them to a particular network device connected to the network hub. Alternatively, the concentrator 16 may be a DSL Access Multiplexer ("DSLAM") that links many ADSL data lines to the data network 12. The data intended for the customer site 24 is sent from the concentrator 16 to an ADSL Transceiver Unit 18 ("ATU") where it is converted to an ADSL signal.

A functional description of the conversion of data to an ADSL signal in the ATU 18 is to be found in ITU-T Recommendation 992.2. The ATU 18 takes the data from the concentrator 16 and frames the data. Thereafter, the ATU applies a cyclic redundancy check, scrambling, forward error correction, coding and interleaving. The data stream is then combined into a data symbol that is input to a constellation encoder. After constellation encoding, the data is modulated to produce an analog signal for transmission to the customer site 24 across the customer loop 22 and splitter 20. The G.Lite signal permits high-speed downstream transfer of digital data from the central office to the customer site 24 at rates up to 1.536 Megabits per second ("Mbps"), depending primarily upon the length of the customer loop 22.

The G.Lite high-speed downstream signal occupies a frequency range of approximately 138 to 552 kiloHertz ("kHz"). Analog voice signals from the PSTN 14, in contrast, occupy a low frequency range of approximately zero to 4 kHz. The high frequency G.Lite signal from the ATU 18 and the low frequency analog signal from the PSTN 14, if present, are combined in a frequency splitter 20 in the central office. The combined signal is sent over the customer loop 22 to the customer site 24.

At the customer site 24, the customer loop 22 from the central office connects to copper wiring within the customer site 24. For example, the copper wiring may be an internal home wiring system having multiple standard wall telephone outlets. A POTS telephone 30 and an ADSL modem 26 may be attached to the same internal copper wiring. Importantly, in the G.Lite version of ADSL, there is no splitter at the customer site 24 for isolating the POTS analog signal from the high-frequency G.Lite signal. Thus for splitterless ADSL, both POTS telephones 30 and ADSL modems 26 may be plugged into the same standard telephone outlets, thereby avoiding the expense and delay of a visit by a technician from the telephone company for the purpose of installing the splitter. The ADSL modem 26 demodulates the G.Lite signal into data which is forwarded to customer premise equipment 28, e.g. a personal computing, multimedia, or video device.

Similarly, in the upstream channel from the customer site 24 to the central office, the ADSL modem 26 may receive data from the customer premise equipment 28 and convert it to an ADSL signal which is placed on the customer loop 22. At the same time, the telephone 30 may be off-hook and sending analog voice signals to the PSTN 14 via the customer loop 22. The G.Lite upstream signal occupies a frequency range of approximately 26 to 134 kHz, providing medium-speed upstream data transfer. Analog voice signals from the telephone 30 are in the low frequency range of approximately zero to 4 kHz. The high frequency G.Lite signal from the ADSL modem 26 and the low frequency analog signal from the telephone 30 are both sent over the customer loop 22 to the central office. The G.Lite signal permits medium-speed upstream transfer of digital data from the customer site 24 to the central office-at rates up to 512 kilobits per second ("kbps").

At the central office, the splitter 20 passes the low-frequency analog signals to the PSTN 14 and passes the high-frequency G.Lite signal to the ATU 18. The G.Lite signal is demodulated by the ATU 18 into data, passed to the concentrator 16, and sent to the data network 12.

An operating environment for the modems and ATUs of the preferred embodiments includes a processing system with at least one Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions may be referred to as being "computer-executed" or "CPU executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to of representative of the data bits. Examples of computing platforms which may support the preferred embodiments include the "Office Connect 811" router platform of the 3Com Corporation of Santa Clara, Calif. Other platforms that may support the preferred embodiments typically incorporate a "C6x" series Digital Signal Processor ("DSP") manufactured by Texas Instruments of Dallas, Tex., as their CPUs. Other CPUs on which the preferred embodiments may run include the "1827" DSP manufactured by Analog Devices of Norwood, Mass. However, it should be understood that the preferred embodiments are not limited to the above mentioned platforms or CPUs and that other platforms and CPUs may support the described methods.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or are distributed among multiple interconnected processing systems that may be local or remote to the processing system.

Discrete Multi-Tone Modulation

The ADSL modem 26 and the ATU 18 modulate data for transmission as a G.Lite signal and demodulate a received G.Lite signal back into data. An ADSL transmitter typically employs a multi-carrier modulator, utilizing Discrete Multi-Tone ("DMT") modulation. The DMT modulator may be implemented by mapping the data values to symbols specified by the magnitude and phase of each carrier, and then performing an inverse discrete Fourier transform ("IDFT") over a symbol frame. The time domain sequence is then transmitted over the customer loop 22, which includes the effects of the subscriber line twisted pair wire and the analog components and amplifiers of the analog front ends of the ADSL transceivers. An ADSL receiver includes a DMT demodulator. The demodulator may be implemented utilizing a discrete Fourier transform ("DFT"), for which there are many algorithms, to recover the magnitude and phase of each carrier to thereby recover the symbols. It is understood that in a typical ADSL configuration, each end of the communication channel uses both a transmitter and receiver, making an ADSL transceiver. As described above, the downstream transmission direction (from the central office to the customer site 24) typically uses a wider bandwidth than the return direction, or upstream direction.

As is known in the art, DMT is a method for dividing the available G.Lite bandwidth into 128 sub-channels from 0 to 552 kHz. Essentially, DMT splits the available bandwidth into a large number of sub-channels, each associated with a "bin" that is 4.3125 kHz wide. The frequency response of the customer loop 22 means that some bins have a higher data transport capacity compared to other bins. Data transport capacity is limited by noise-on the customer loop 22, including external radio-frequency sources, thermal noise, and cross-talk from other customer loops. By measuring the frequency response of the customer loop 22, the ATU 18 and modem 26 may determine the data carrying capacity of each sub-channel. In this manner, DMT may allocate data so that the throughput of each sub-channel is maximized.

Figure 2:
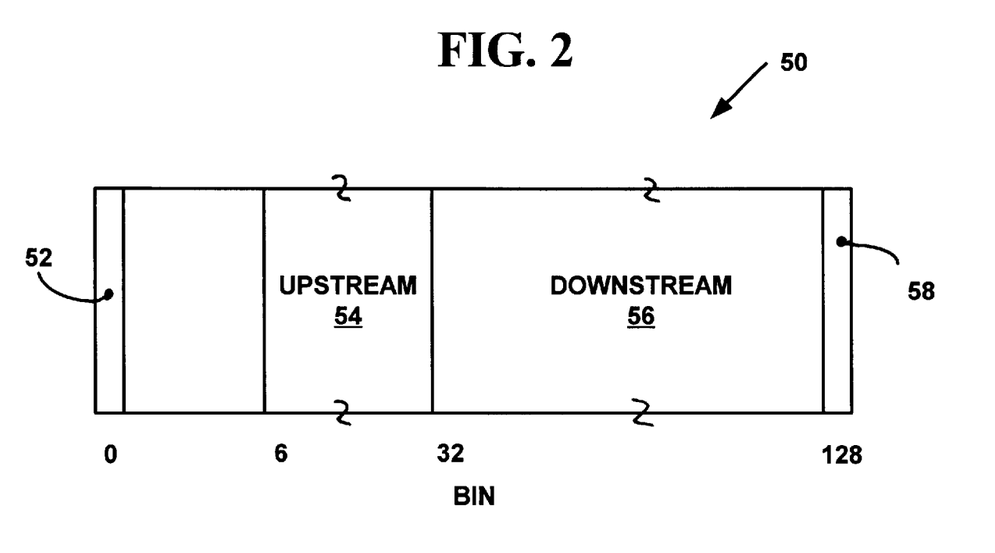
FIG. 2 is a diagram illustrating the available bandwidth for G.Lite modems.

FIG. 2 is a diagram illustrating the available bandwidth 50 for G.Lite modems such as the ADSL modem 26. Bins 0 to 5, corresponding to 0 to 25.875 kHz, are reserved for POTS 52. Although the POTS 52 bandwidth is typically only about 4 kHz, DMT has large sidelobes that may bleed down to lower frequencies. Upstream data 54 is transmitted in bins 6 to 31, corresponding to 25.875 kHz to 138 kHz. With the inclusion of echo canceling, these bins may also permit medium speed downstream transfer. Downstream data 56 is transmitted in bins 32 to 127, corresponding to 138 kHz to 552 kHz. Finally, bin 128 corresponds to the Nyquist frequency 58 for the ADSL signal and no data is transmitted in this bin.

An Initialization Sequence procedure, also known as an initialization procedure, is defined for G.Lite modems to determine attributes of the connecting channel and establish transmission and processing characteristics suitable to that channel. As known to those skilled in the ADSL art, during the Initialization Sequence procedure, the ATU 18 and ADSL modem 26 exchange expected far-end transmitter settings. Typically, they communicate to each other's far-end transmitter the number of bits and relative power levels that are to be used on each DMT subcarrier. Each transceiver produces and responds to a specific set of precisely timed signals and determines channel attributes and establishes transmission characteristics. A successful Initialization Sequence procedure results in the ATU 18 and ADSL modem 26 reaching a data transfer mode known as Showtime. Once the ATU 18 and ADSL modem 26 reach Showtime, they have established modulation schemes for the channel attributes. The ATU 18 and ADSL modem 26 store these modulation schemes, which may be selected again during a Fast Retrain procedure.

A Fast Retrain procedure is defined for G.Lite modems to adapt transmission characteristics to changing customer loop 22 conditions, such as may be caused by telephone 30 on/off hook transitions. As known to those skilled in the ADSL art, during the Fast Retrain procedure the ATU 18 sends a predetermined series of tones to the ADSL modem 26. The modem 26 at the other end of the customer loop 22 receives the tones and measures the power of the signal received in each bin. From these measurements, the modem 26 is able to determine the frequency response of the customer loop 22. From this, the modem 26 determines the signal-to-noise ratio ("SNR") in each bin and hence derives a value for the maximum data throughput for that bin. The modem 26 may then independently select a downstream modulation scheme from a set of previously negotiated modulation schemes to optimize the throughput for the downstream transmission bins. Similarly, the modem 26 sends a predetermined series of tones which are received by the ATU 18. The ATU 18 may also determine the maximum data throughput for each bin. The ATU 18 may then independently select an upstream modulation scheme from a set of previously negotiated modulation schemes to optimize the throughput for the upstream transmission bins. Power levels for the modem 26 and the ATU 18 are set during a Fast Retrain procedure.

Audible Noise Reduction

The ADSL modem 26 generates audible noise in the telephone 30 when the telephone 30 is off hook. The DMT transmissions from the modem 26 reach the telephone 30 through the local telephone loop 22 and interact with the electronics in the telephone 30. This interaction with the telephone 30 electronics in the absence of a splitter at the customer site 20 is the most common source of the audible noise. Unless the power of the modem 26 output signal is cut back, the customer may be unable to use the telephone 30 whilst simultaneously transferring data from the modem 26 because the audible noise is overwhelming.

The level of audible noise generated in the telephone 30 is dependent on the model of telephone. Some telephones are noisier than others. The degree of power cutback of the modem 26 required to suppress the audible noise is dependent on the model of telephone. Quieter models of telephones include: General Electric models 2-9221 and 2-9295; Lucent/AT&T models 210 and 9200; Bell South model 33012; and White-Westinghouse model WNCP-440. Once the transmitted power from the modem 26 is cut back by the required amount, the user may use the telephone 30 and the modem 26 simultaneously.

Figure 3:
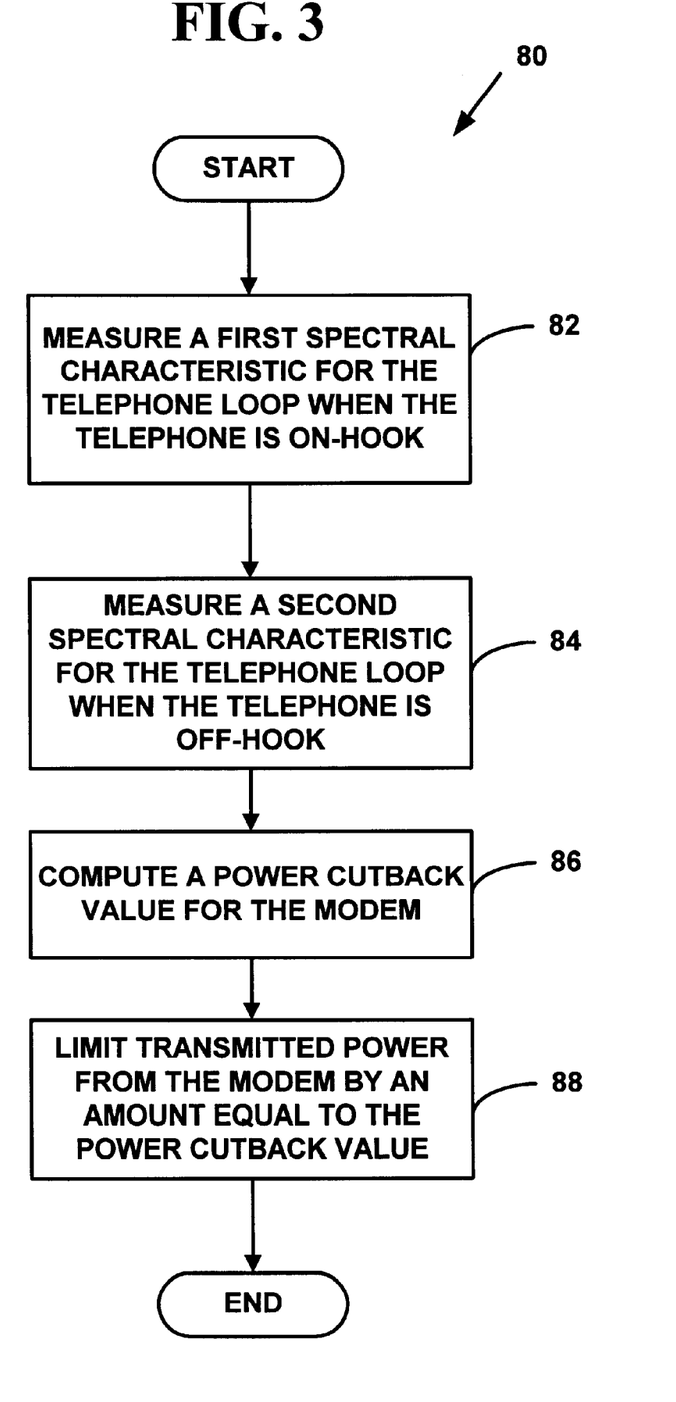
FIG. 3 is a flow diagram illustrating a method for reducing noise in a telephone from a splitterless ADSL modem.

FIG. 3 is a flow diagram illustrating a preferred method 80 for reducing audible noise in a telephone 30 from a splitterless Asymmetric Digital Subscriber Line modem 26. The telephone 30 and the modem 26 share a telephone loop 22. At step 82, a first spectral characteristic is measured by the modem 26, for the telephone loop 22 when the telephone 30 is on-hook. A second spectral characteristic for the telephone loop 22 is measured, by the modem 26, when the telephone 30 is off-hook at step 84. At step 86, a power cutback value for the modem 26 is computed. The power cutback value is determined from the first spectral characteristic and the second spectral characteristic. At step 88, transmitted power from the modem 26 is limited by an amount equal to the power cutback value. In this manner, audible noise in the telephone 30 from the modem 26 is substantially reduced, enabling simultaneous use of the telephone 30 and the modem 26.

The power cutback required to suppress the audible noise depends on the quality of telephone 30 in the customer loop 22. The modem 26 may distinguish between a noisy telephone and a quiet telephone. In one exemplary preferred embodiment of the present invention, the modem 26 ascertains the quality of the telephone 30 with which it shares a local telephone loop 22 by monitoring Fast Retrain signals from the ATU 18. Fast Retrain, as mentioned above, are a series of tones, power levels, and procedures that allow G.lite modems to modify their transmission characteristics before entering a data transfer mode. The modem 26 monitors Fast Retrain signals while the telephone 30 is on-hook, corresponding to step 82, and again while the telephone 30 is off-hook corresponding to step 84. A comparison of both signals may indicate how the presence of the telephone 30 influences transmission characteristics of the local customer loop 22 and provides an indication of the quality of the telephone 30.

A Fast Retrain procedure may be initiated by either the ATU 18 or the ADSL modem 26. In accordance with preferred embodiments, a Fast Retrain procedure may be initiated by the ADSL modem 26 under two circumstances. A first circumstance is when the modem 26 is starting up. The modem 26 requests an entry to Fast Retrain for the purpose of measuring a spectral characteristic of the customer loop 22 when the telephone 30 is not in the circuit, i.e. the telephone 30 is on-hook. In one exemplary preferred embodiment, the spectral characteristic referred to in step 82 is the slope of a C-REVERB-FR1 signal's envelope when the telephone 30 is on-hook. Hardware on the modem 26 determines whether the telephone 30 is on- or off-hook. This entry is made from a handshake protocol, known to those skilled in the art as "G.hs," which is running on the CPU in the modem 26. C-REVERB-FR1 is described in Section 12 of ITU-T Recommendation G.992, and G.hs is described in ITU-T Recommendation G.994.1 which is incorporated herein by reference.

The second circumstance for Fast Retrain is when the ATU 18 and modem 26 are in data transfer mode, also known as "Showtime" mode to those familiar with G.992. If the modem 26 detects the telephone 30 going off-hook, it initiates the Fast Retrain procedure, according to the guidelines in Section 12.3 of G.992, for the purpose of measuring a spectral characteristic of the customer loop 22 when the telephone 30 is in the circuit, i.e. the telephone 30 is off-hook. In another exemplary preferred embodiment, this spectral characteristic is also the slope of the C-REVERB-FR1 signal's envelope, only now in the off-hook condition, corresponding to the spectral characteristic referred to in step 84. Upon detection of the telephone 30 going off-hook, the modem 26 stops sending data and begins sending a R-RECOV signal. R-RECOV is a single tone signal corresponding to sub-carrier bin 20 without a cyclic prefix. R-RECOV is transmitted by the modem 26 at nominal power (−38 deciBels below one milliwatt per Hertz ("dBm/Hz")). When the ATU 18 detects the R-RECOV signal, it stops sending data and begins sending a C-RECOV signal. C-RECOV is a single tone signal corresponding to sub-carrier bin 68 without a cyclic prefix accompanied by a pilot sub-carrier in bin 64. The C-RECOV signal is transmitted by the ATU 18 at nominal power (−40 dBm/Hz). C-RECOV is sent for exactly 64 symbols, at which point the ATU 18 begins sending C-REVERB-FR1.

The modem 26 controls the length of the C-REVERB-FR1 signal. The ATU 18 continues to send the C-REVERB-FR1 signal until it receives the R-REVERB-FR1 for at least 32 symbols. The modem 26 continues to send R-RECOV while it measures the slope of the envelope of the C-REVERB-FR1 signal. In practice, the modem 26 only needs 64 symbols worth of the C-REVERB-FR1 signal to effectively characterize the slope of the envelope, at which point it would transition to sending the R-REVERB-FR1 signal in order to continue the Fast Retrain process with the ATU 18.

Figure 4:
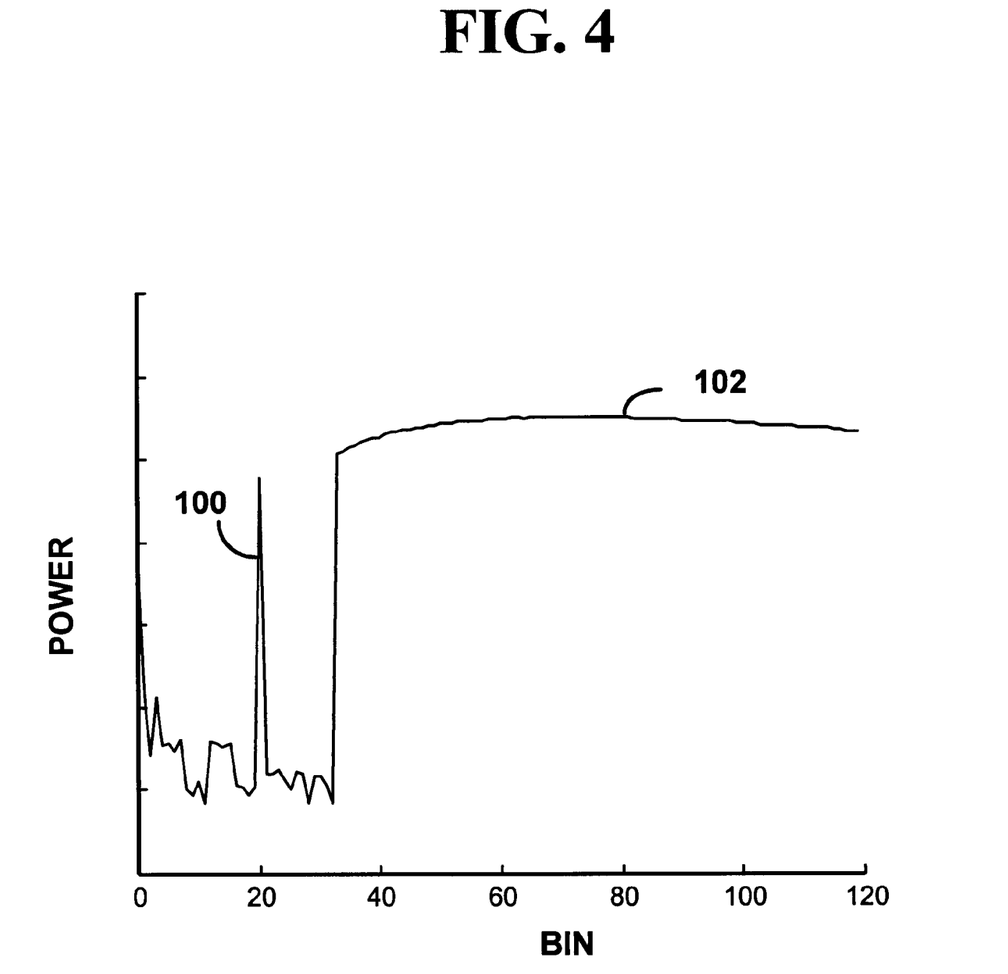
FIG. 4 is a graph illustrating an envelope of a typical on-hook C-REVERB-FR1 signal.

FIG. 4 is a graph illustrating an envelope 102 of a typical on-hook C-REVERB-FR1 signal. This signal was measured by an ADSL modem 26 on a 24 American Wire Gauge ("AWG") telephone line that is 4000 feet long. In this Figure, the upstream bins are from 6 to 31 and the R-RECOV tone 100 can be seen at bin 20. The envelope 102 represents a distribution of power measured by the modem 26 upon receiving the C-REVERB-FR1 tones from the ATU 18. The power is measured logarithmically with respect to a nominal power value.

The slope of the envelope 102 may be measured in several ways known to those skilled in the art. In one exemplary preferred embodiment, logarithmic power values may be measured for multiple bins and a straight-line fit performed to estimate the slope of the envelope 102. In another exemplary preferred embodiment, logarithmic power values may be measured for only two bins and a slope estimated from the two measurements. For example, the two bins may be chosen to be bin 51 corresponding to a lower frequency in the envelope 102 and bin 120 corresponding to a higher frequency in the envelope 102. An estimate for the slope of the envelope 102 may be derived from Equation 1.

$$\frac{\log(\text{Average Power in Bin } 120) - \log(\text{Average Power in Bin } 51)}{120 - 51} \quad (1)$$

The average power in each bin is calculated by squaring the real and imaginary values produced by a Fast Fourier Transform ("FFT") process, and adding the two values together. Accumulating these values over 64 symbols for both bin 51 and bin 120, and dividing each of these results by 64 yields the average power in each of these bins. For example, the slope of the envelope 120 for the on-hook telephone 30 measured by the modem 26 on a 24 American Wire Gauge ("AWG") telephone line that is 4000 feet long is typically found to be approximately −0.012 deciBels per bin ("dB/bin").

In another exemplary preferred embodiment, an estimate of the quality of the telephone 30 may be made by computing a difference between the slope of the C-REVERB-FR1 signal while the telephone 30 is on-hook and the slope of another C-REVERB-FR1 signal while the telephone 30 is off-hook. The difference in slope between the on-hook and off-hook values is typically independent of the length of the loop 22 because we are taking a difference between logarithms of average power. We have determined that if the slope difference satisfies Equation 2, then telephone 30 is typically a noisy telephone.

Slope(on-hook)−Slope(off-hook)>0.036 dB/bin           (2)

Equivalently, expressed in other units, the slope difference is $8.4 \times 10^{-3}$ dB/kHz.

Equation 2 sets an approximate threshold for determining the quality of the telephone 30 on the customer loop 22 with the modem 26. In one exemplary preferred embodiment of the present invention, a noisier telephone 30, i.e. where the slope satisfies Equation 2, requires a cutback of approximately 24 dB in power transmitted by the modem 26 in the upstream bandwidth 54 to suppress the audible noise. The power cutback value is measured with respect to the nominal transmitted power value of −38 dBm/Hz for the modem 26. In another exemplary preferred embodiment, a quieter telephone 30, i.e. where the slope does not satisfy Equation 2, only requires a power cutback of approximately 12 dB by the modem 26. The power cutback may be applied during an R-REVERB-FR3 period of Fast Retrain. However, it should be understood that the present invention is not restricted to these power cutback values and that other values are possible. Moreover, it should be understood that the present invention is not restricted to the method 80 of power cutback of FIG. 3 and that other methods of implementing a power cutback are possible.

Recovery from Insufficient Transmit Power

The ADSL modem 26 preferably applies the power cutback during the Fast Retrain procedure as described above. Unfortunately, the applied power cutback may be such that the modem's 26 new transmitted power level is too low for the ATU 18 at the central office to receive signals from the modem 26. This may occur, for example, if the customer loop 22 introduces a large signal attenuation of its own.

Figure 5:
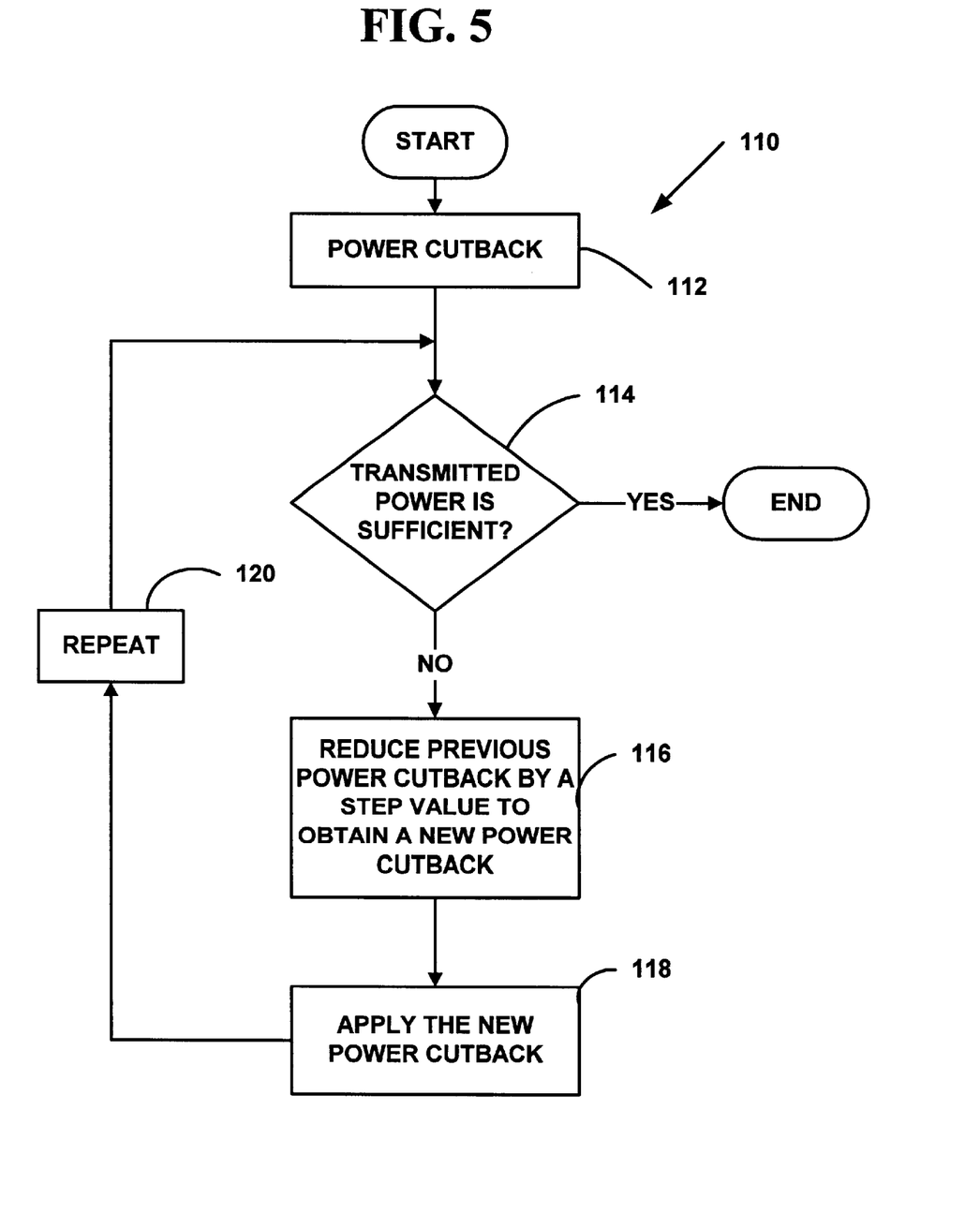
FIG. 5 is a flow diagram illustrating a preferred method for ADSL modem recovery from an excessive power cutback.

FIG. 5 is a flow diagram illustrating a preferred method 110 for recovering from such an excessive power cutback 112 in a splitterless ADSL modem 26. The excessive power cutback 112 decreases transmitted power from the modem 26 to such an extent that it prevents communication between the modem 26 and a central office. The modem 26 implements the power cutback 112 to enable simultaneous use of a telephone 30 and the modem 26. For example, the modem 26 may impose the power cutback 112 to reduce audible noise in the telephone 30 as described above with reference to the method 80 of FIG. 3. At step 114, the method 110 determines whether the transmitted power from the modem 26 after a previous power cutback 112 is sufficient to establish communication between the modem 26 and the central office. If the transmitted power is not sufficient, the modem 26 reduces the previous power cutback by a step value to obtain a new power cutback at step 116. The modem applies the new power cutback to the modem 26 to obtain a new transmitted power at step 118. At step 120, the modem 26 repeats the above steps 114–118 until the transmitted power after the new power cutback is sufficient to establish communication between the modem 26 and the central office. In this manner, the modem 26 may gradually recover its data connection to the central office while allowing simultaneous use of the telephone 30 and modem 26 on the customer loop 22.

Determining Whether the Transmitted Power is Sufficient

The modem first implements a power cutback at step 112. For example, the power cutback may include the method 80 of FIG. 3 as described above. If the transmitted power of the modem 26, as reduced at step 112, permits data transfer, such as a Showtime mode, there is no need for the recovery steps 116–120 and the modem 26 may continue to the data transfer mode. Alternatively, if the transmitted power of the modem 26 does not permit data transfer, the modem 26 implements the recovery steps 116–120.

The modem 26 may determine whether the transmitted power from the modem 26 is sufficient or not to establish communication between the modem 26 and the central office at Step 114 in several ways. The ATU 18 determines that a loss of signal has occurred when there is a time out in the Fast Retrain flow. When an error, such as a timeout, occurs, modem 26 typically proceeds to the G.hs procedure or retries the Fast Retrain procedure. In one exemplary preferred embodiment, the determination uses properties of a Fast Retrain procedure. For example, in the method 80 for reducing audible noise in the telephone 30 described above, the modem 26 may cut back its power during an R-REVERB-FR3 period of Fast Retrain. R-REVERB-FR3 is described in ITU-T Recommendation G-992. However, once the modem 26 cuts back its transmitted power, the ATU 18 at the central office may lose the signal from the modem. The ATU 18 may recognize this loss of signal by the failure of the modem 26 to complete the Fast Retrain procedure. For example, after the R-REVERB-FR3 period the ATU 18 may note that it has not received one of the next expected signals from the modem 26, such as R-REVERB-FR4 tones.

Upon losing the signal from the modem 26 during Fast Retrain, the modem 26 and ATU 18 are not able to communicate in the Showtime data transfer mode. The transmitted power from the modem 26 is insufficient to maintain the link between the ATU 18 and the modem 26. As is known to those skilled in the ADSL art, when such a loss of signal occurs, the modem 26 may retry the Fast Retrain procedure or may enter a G.hs handshake protocol with the ATU 18. Such a Fast Retrain procedure or handshake protocol may occur at the respective nominal power value for the ATU 18 and modem 26. The ATU 18 enters the G.hs protocol in response to the modem 26 initiating the protocol. The modem 26 begins retraining as part of re-establishing its communication with the central office ATU 18. As part of the handshake protocol, the modem 26 may again initiate a Fast Retrain procedure by methods known to those skilled in the art and repeat the method 110. The modem 26 repeats the method 110 until the power cutback is sufficient to re-establish communication between the modem 26 and the ATU 18. However, it should be understood that the determining step 114 of the above embodiment is not limited to using the properties of the Fast Retrain procedure. Many other methods for determining insufficient transmit power are possible and familiar to those skilled in the art.

Upon successfully completing the Fast Retrain procedure, the modem 26 and ATU 18 typically proceed through the G.hs handshake protocol and enter the Initialization Sequence procedure. The modem 26 and ATU 18 may attempt to proceed through the Initialization sequence and enter the data transfer mode referred to as Showtime. If the transmitted power is insufficient, the ATU 18 may lose the signal from the modem 26 or the ATU 18 may determine that there is insufficient SNR to support the data transfer mode. In either of these cases, the modem 26 may repeat the Fast Retrain procedure, reduce the power cutback, and retry the Initialization Sequence procedure. The modem 26 typically repeats the power cutback method 110 until the power cutback is sufficient to re-establish communication between the modem 26 and the ATU 18.

Power Cutback Reduction

If the modem 26 transmits with insufficient power because of a power cutback, the modem 26 decreases the power cutback by a step value at step 116, i.e., it increases the transmitted power. The modem 26 tries again to establish communication with the ATU 18 and repeats the stepwise increase in power until the transmitted power is sufficient for communication. In the example above, the first power cutback, at step 112, was to reduce audible noise in the telephone 30 or to improve downstream data transfer, but was too excessive and prevents data transfer. Increasing transmitted power in steps to recover from the excessive cutback may eventually reach an acceptable transmit power where the power requirements for data transfer and noise reduction are balanced. The step value may be sufficiently small that successive steps do not overshoot the acceptable power level. The step value may also be sufficiently large that it does not take much iteration to reach the acceptable balancing power level. In one exemplary preferred embodiment, the step value is approximately four decibels. However, as can be appreciated by those skilled in the art, the modem 26 may use other step values and the present invention is not limited to a step value of approximately four decibels. Larger step values allow the modem 26 to reach an acceptable power level more quickly. Smaller step values, may be used to reduce the likelihood of overshooting the minimum acceptable power level. As an alternative, a combination of small and large step values may be used. For example, a step value of 5 dB may be used for the first few iterations of the method 110, after which the step value may be decreased, such as to 2 dB.

In each iteration, the modem 26 reduces the power cutback by the step value. The power cutback value may be stored in the modem 26 as a number in a memory location. Each successive iteration may impose the reduction by subtracting the step value from the number and storing the result in the memory location. However, those skilled in the art will appreciate that other methods for reducing the power cutback are possible, and the present invention is not restricted to storing its power cutback in a memory location. When applying the power cutback, at step 118, the modem 26 may access the memory location and use the stored number to set the power level for the modem's 26 transmitter. Once set, the modem 26 may continue transmitting at the new transmitted power level. In one exemplary preferred embodiment, when the modem 26 and ATU 18 initiate a handshake protocol as described above, the modem 26 may set the new transmitting power during the Fast Retrain process.

The modem 26 may use a cutback indicator to record that it is implementing the power cutback and recovery method 110. The modem 26 may access the cutback indicator to determine that it is in recovery and ensure that the modem 26 implements the appropriate procedures and protocols. The modem 26 may clear the cutback indicator when the modem 26 and the ATU 18 enter a data communication mode, such as Showtime, when the transmitted power is sufficient for data transfer. In one exemplary preferred embodiment, the cutback indicator is a counter. Setting the counter to zero may clear the cutback indicator and the modem 26 may set the cutback indicator by increasing the counter each time that the modem 26 implements a power cutback. In another exemplary preferred embodiment, the cutback indicator is a flag that is set when the modem 26 implements a power cutback and cleared when the modem 26 transmits with sufficient power for data communication. However, the present invention is not limited to flags or counters, and other similar known forms of the cutback indicator may be used.

With reference to FIG. 5, the cutback indicator may be clear at the start of the method 110. The modem 26 may set the cutback indicator when the first power cutback occurs at Step 112 to record that one cutback 112 has occurred. If the transmitted power is sufficient at step 114, the modem 26 enters the data transfer mode and clears the cutback indicator. Alternatively, if the transmit power is not sufficient the modem 26 enters the recovery mode of steps 114–120. The cutback indicator remains set during each iteration and subsequent power cutback until it is cleared after a successful communication with the ATU 18 by entry into Showtime, as known to those skilled in the art.

The modem 26 may also clear the cutback indicator if the transmitted power is close to the nominal value. The new power cutback is approximately zero and cannot be decreased because the modem 26 cannot transmit at a higher power level than its nominal power level. This may occur if the first power cutback at step 112 was too small due to some error. In such a situation, the modem 26 may implement another complete power cutback, such as that of step 112, to correct the error.

Exemplary Embodiment of a Power Cutback Recovery Method

Figure 6A:
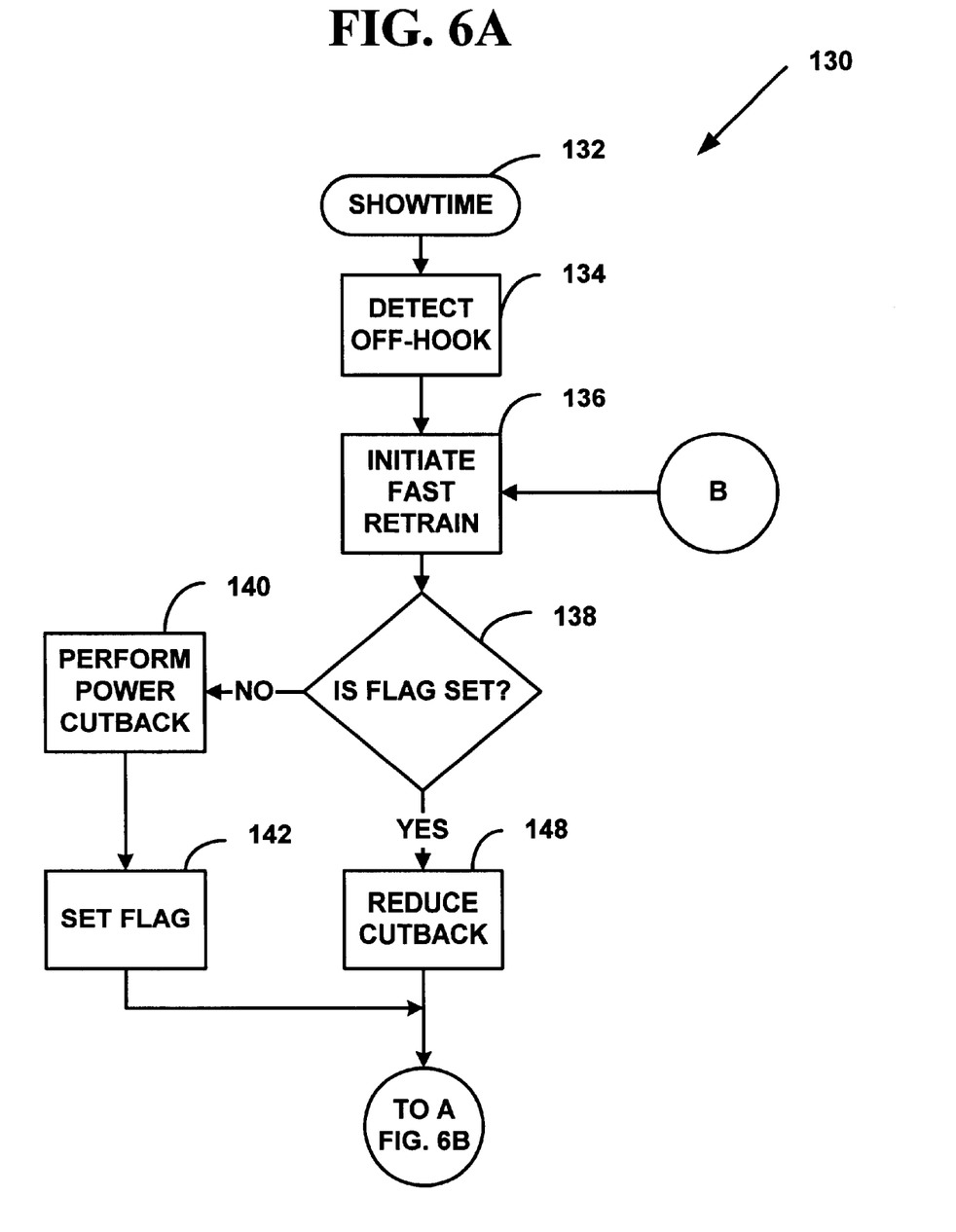
FIG. 6 is a flow diagram illustrating an alternative preferred method for ADSL modem recovery from an excessive power cutback.
Figure 6B:
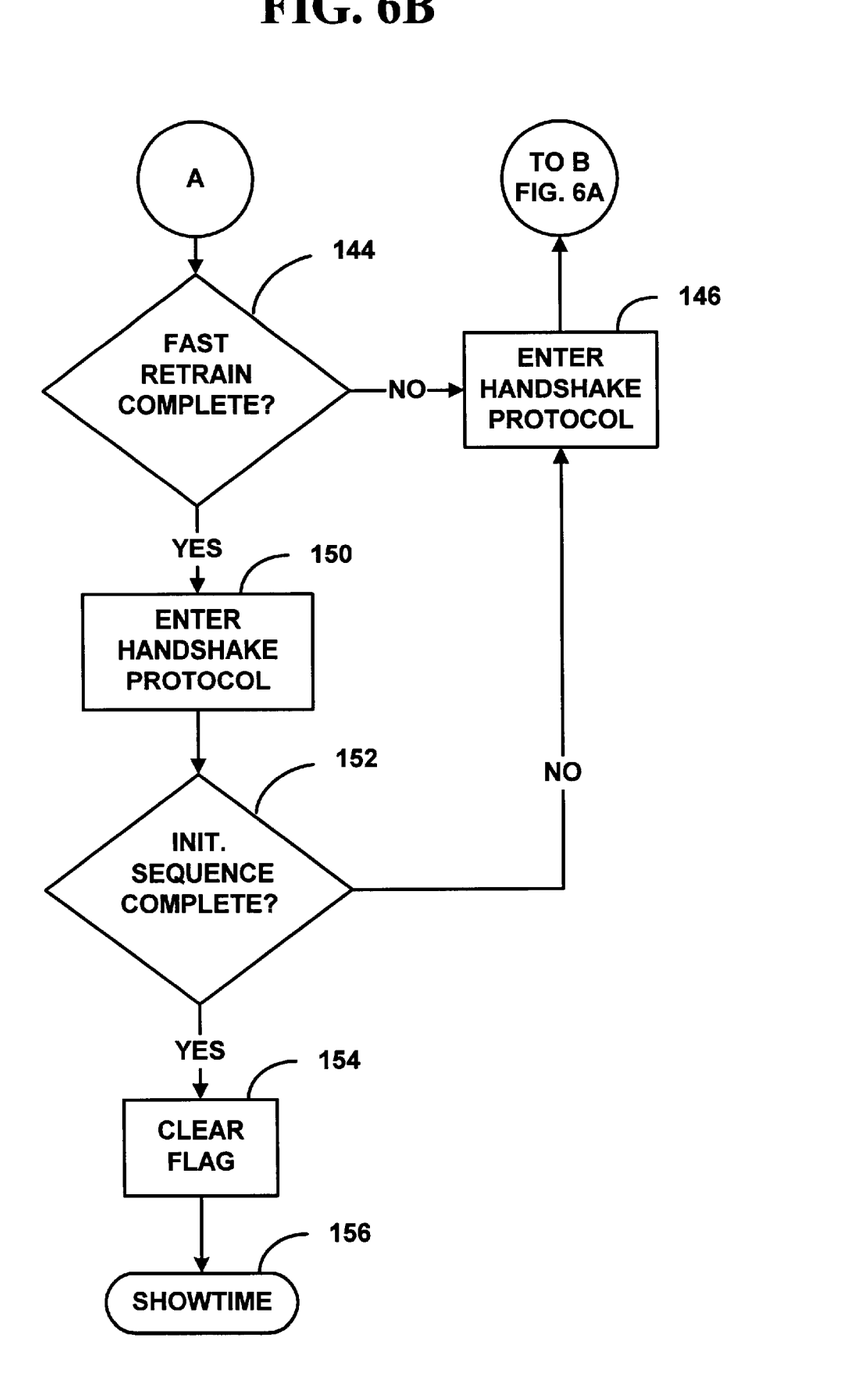

FIG. 6 is a flow diagram illustrating an alternative preferred method 130 for recovering from an excessive power cutback in a splitterless ADSL modem 26. The purpose of the power cutback is to enable simultaneous use of the modem 26 and the telephone 30 over the same customer loop 22. For example, the telephone 30 may be on-hook at step 132 and the modem 26 exchanges data with the ATU 18 in Showtime mode. In the exemplary preferred embodiment of method 130, the modem 26 detects when the telephone 30 goes off-hook at step 134. Without a power cutback, audible noise may bleed into the telephone 30 from the modem 26 and prevent simultaneous usage of the telephone 30 and modem 26. As described above, upon detecting the off-hook at step 134, the modem 26 initiates a Fast Retrain procedure at step 136. The Fast Retrain procedure may provide the off-hook power slope to the modem for calculation of the power cutback as described above with reference to FIG. 3.

At step 138, the modem 26 accesses a flag and determines if the flag is set or not. The flag records whether the modem 26 is implementing at least one power cutback. If the flag is not set, as it is in the initial state, i.e. before implementing the method 130, the modem 26 performs a power cutback at step 140. In accordance with a preferred embodiment, the power cutback method is the power cutback method 80 of FIG. 3. After performing the first power cutback of the method 130, the modem 26 sets the flag at step 142 to indicate that it has performed at least one power cutback.

At step 144, the modem 26 determines whether the transmitted power is sufficient to complete the Fast Retrain procedure. If the power cutback at step 140 was too great, signals from the modem 26 will not be strong enough for the ATU's 18 receiver once they traverse the customer loop 22 from the modem 26 to the ATU 18. If the power cutback is not excessive, however, the modem 26 may succeed in completing the Fast Retrain procedure and have sufficient power to attempt to complete the Initialization Sequence procedure by preferably entering a G.hs handshake protocol at step 150 as described in the ITU-T Recommendation G.992.2.

However, if the transmitted power after cutback is insufficient, the modem preferably enters a G.hs handshake protocol at step 146 which may include initiating a Fast Retrain at step 136, or the protocol may be configured to initiate a Fast Retrain by any other method known to those skilled in the art. The reinitiation of the new Fast Retrain begins a repetition of the steps 136–156 of the power cutback and recovery method 130. The modem 26 again determines whether the flag is set at step 138. As the modem 26 has cycled back to a Fast Retrain procedure due to an excessive power cutback, the flag was set at step 142 and the modem 26 reduces the power cutback at step 148. The modem 26 reduces the power cutback by a step value and applies the new power cutback to the modem's 26 transmitter. Again, the modem 26 determines whether the new transmitted power is sufficient to complete the Fast Retrain at step 144. If not, the modem 26 reiterates steps 146, 136, 138, 148, and 144 until the power is sufficient to complete the Fast Retrain procedure.

Returning to step 144 when the modem 26 successfully completes the Fast Retrain procedure, the modem 26 attempts to complete the Initialization Sequence procedure by preferably entering the G.hs handshake protocol at step 150. At step 152, the modem 26 determines whether the transmitted power is sufficient to complete the Initialization Sequence procedure. If the power cutback at step 140 was too great, signals from the modem 26 will not be strong enough for the ATU's 18 receiver once they traverse the customer loop 22 from the modem 26 to the ATU 18. If the power cutback is not excessive, however, the modem 26 may succeed in completing the Initialization Sequence procedure.

However, if the transmitted power after cutback is insufficient, the modem preferably enters a G.hs handshake protocol at step 146 which may include initiating a Fast Retrain at step 136, or the protocol may be configured to initiate a Fast Retrain by any other method known to those skilled in the art. The reinitiation of the new Fast Retrain begins a repetition of the steps 136–156 of the power cutback and recovery method 130. The modem 26 again determines whether the flag is set at step 138. As the modem 26 has cycled back to a Fast Retrain procedure due to an excessive power cutback, the flag was set at step 142 and the modem 26 reduces the power cutback at step 148. The modem 26 reduces the power cutback by a step value and applies the new power cutback to the modem's 26 transmitter. Again, the modem 26 determines whether the new transmitted power is sufficient to complete the Fast Retrain at step 144. If not, the modem 26 reiterates steps 146, 136, 138, 148, and 144 until the power is sufficient to complete the Fast Retrain procedure. If the power is sufficient to complete the Fast Retrain procedure at step 144, the modem 26 again enters the G.hs handshake protocol at step 150 and determines whether the new transmitted power is sufficient to complete the Initialization Sequence procedure at step 152. If not, the modem 26 reiterates steps 146, 136, 138, 148, 144, 150, and 152 until the power is sufficient to complete the Initialization Sequence procedure. Upon reaching an acceptable transmit power where the power requirements for data transfer and noise reduction are balanced, the modem 26 clears the flag at step 154 and enters the Showtime mode at step 156.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or components may be used in the block diagrams.

The claims should not be read as limited to the described order or elements unless stated to that effect. In addition, use of the term "means" in any claim is intended to invoke 35 U.S.C. §112; paragraph 6, and any claim without the word "means" is not so intended. Therefore, all embodiments that come within the scope and spirit of the following claims and equivalents thereto are claimed as the invention.

APPENDIX

```
// Author: Marty Staszak
// Company: 3Com
// The following C code implements the power cutback recovery method as
// described in the detailed description. A reader of this code should be
// familiar with the following concepts: C Coding practices, basic software
// data structures, and the ITU specification G.992.2 (G.lite).
// In addition, where necessary to ensure the clarity of the power cutback
// recovery implementation, the following code includes function calls related
// to a preferred power cutback method.
// The implementation is taken from a header file, and a ".c" file.
// From the header file:
//*********************************************************************
// DEFINITION
// A flag is defined which reflects the condition that power cutback has been
// applied to the modem's transmitted signal. This flag is set when power
// cutback is applied. For G.992.2 modems, this occurs during the R_QUIET_FR1
// state (please see the G.992.2 specification if this term is unfamiliar).
// This flag is cleared whenever the modem reaches the "Showtime" state.
bool bPowerCutbackinProgress;
// TRUE = power cutback has been applied to the modem.
// From the C code files...
//*********************************************************
// INITIALIZATION
// During Initialization of Modem, the function seqInit is called. It is
// appropriate to initialize the global flags in this function, and thus our
```

-continued

APPENDIX

```
// flag bPowerCutbackinProgress is initialized to FALSE -> cleared.
void seqInit(uint32 uInst)
{
    bPowerCutbackinProgress = FALSE;
    // ... implement other flag/data structure initialization as appropriate
}
//*******************************************************
// STATE HANDLER: RxC_REVERB_FR1f
//
// REVERB_FR1 is a state within the G.992.2 Fast Retrain procedure which
// occurs before power cutback is applied. This is an appropriate stage in the
// Fast Retrain procedure for an ADSL modem to calculate a new power level.
// The calculation of the new power level can be more aptly done by
// considering past abilities of the modem to successfully train at reduced
// power levels.
//
// If the bPowerCutbackinProgress flag is set, we have re-entered the Fast
// Retrain procedure after cutting back power and failing to get back to
// Showtime. We may be able to recover modem connectivity by increasing the
// modem transmit power incrementally, and trying again.
//
// In the following code, the variable byPowerIndex establishes the amount
// of cutback to use. Increments are done in 4db steps (1 index = 2db)
//
#define TX_RECOV_INCREMENT   2 // 4 db increment
void RxC_REVERB_FR1f( )
{
    if (bPowerCutbackinProgress == TRUE)
    {
        byPowerIndex -= TX_RECOV_INCREMENT;   // decrease cutback by 2db
        // If we have tried all the power levels, we are not allowed to
        // transmit above nominal power (index < 0), so we set the index
        // to 0, and assert there is no cutback in progress.
        if (byPowerIndex < 0)
        {
            byPowerIndex = 0;
            bPowerCutbackinProgress = FALSE;
        }
    }
    // ... implement other data structure changes necessary to
    // successfully receive the CO's REVERB_FR1 signal
}
//**************************************************************
// STATE HANDLER: TxR_QUIET_FR1a
//
// Power reduction is applied during the QUIET_FR1 state of the G.992.2 Fast
// Retrain Procedure. byPowerIndex establishes the amount of cutback.
// byBNMaxIndex actually means the least amount of cutback we will allow
// (generally, this value is 0, but, we have seen some phones where we would
// never want to transmit above a particular cutback level). The trigger to
// indicate the bPowerCutbackinProgress is that we are transmitting at a
// cutback level greater than byBNMaxIndex.
//
void TxR_QUIET_FR1a( )
{
    if (byPowerIndex > byBNMaxIndex)
        bPowerCutbackinProgress = TRUE;
    else
        bPowerCutbackinProgress = FALSE;
    GenTone(QUIET_TONE, QUIET_LEVEL);
    // ... set other parameters which influence transmit levels or
    // establish timeout values.
    // ... set up error handlers
}
//*******************************************************
// STATE HANDLER: SHOWTIME:
//
// Showtime is the state at which the two G.992.2 modems begin passing data.
// All other training stages/states have been successfully executed. If a
// power cutback was in progress, the flag is cleared.
//
void TxR_SHOWTIME()
{
    bPowerCutbackinProgress = FALSE;
    // ... implement other flag setting/clearing as appropriate
```

-continued

APPENDIX

```
    // ... register error handlers for CRC errors
    // ... install tone detectors to look for C_RECOV or GHS tones
}
//****************************************************************
// ADDITIONAL CONSIDERATIONS
//
// We have discovered via our testing and refinement of this method that
// there are conditions under which the bPowerCutbackinProgress flag must be
// reset due to changes to line conditions or the inability of the modems to
// connect at any power level. The following code sections relate how these
// conditions were handled within the preferred embodiment of power cutback
// recovery.
//*********************************************************
// TONE HANDLER: WaitC_Tones
//
// Within WaitC_Tones, we may need to perform maintenance on the
// bPowercCutbackinProgress flag under the following conditions:
//
// WaitC_Tones looks for tones from the CO indicating the end of the CO's
// C_RECOV portion of Fast Retrain. Under normal circumstances, we run this
// code immediately after exiting the Showtime mode, at the start of the Fast
// Retrain procedure. We also may enter this code as a result of the
// occurrence of an event that invalidates the Full Initialization or the Fast
// Retrain training procedures, such as the phone going onhook, or, a second
// phone going offhook. In this case, we want to clear the
// bPowerCutbackinProgress flag and restart Fast Retrain "from scratch".
//
// Within the following code, such an event occuring is identified by the
// bDisturb flag. The case of entering the code from Showtime (which will also
// have bDisturb set to TRUE)is distinguished from the "new event" case by the
// bShowtime flag.
//
void WaitC_Tones( )
{
    if (bDisturb)
    {
        if (bShowtime == FALSE)
        {
            bPowerCutbackinProgress = FALSE;
        }
        bDisturb = FALSE;
    }
    // ... implement other tone handling code as needed
}
//*********************************************************
// ERROR HANDLER: InitResetProc
//
// This function is called whenever the modem encounters an error while
// training. In the case where we have been in SHOWTIME, we have received an
// off-hook event, we have determined the power cutback to use, we have tried
// this level and every other level up to and including no power cutback, and
// have still not been successful in training, then we must put the modem into
// an idle state because we cannot connect at any level. This condition is
// embodied in the first conditional statement below "if((byGhsEscape..."
//
void InitResetProc( )
{
    if((byGhsEscapetoFR == 1) && !bPowerCutbackinProgress
    {
        // We have not reconnected from off-hook event after cycling
        // through tx power levels, report LOS
        InitTxSequence(TXRT_Idle);          // init to R-IDLE state
        InitRxSequence (RxCO_Init);
        DisconnectReason(RespConnectionLost, LossOfSignal);
    }
    else
    {
        // implement normal recovery mechanisms, as is appropriate for
        // your modem. Setting up to run G.hs is a common reset action
    }
}
```

We claim:

1. A method for recovering from a power cutback in a splitterless Asymmetric Digital Subscriber Line modem, where the power cutback enables simultaneous use of a telephone and the modem, the method comprising the steps of:
  determining whether transmitted power from the modem after a previous power cutback is sufficient to establish communication between the modem and a central office, and if not,
    reducing the previous power cutback by a step value to obtain a new power cutback, and
    applying the new power cutback to the modem to obtain a new transmitted power;
  repeating the above steps until the new transmitted power after the new power cutback is sufficient to establish communication between the modem and the central office, and
  wherein the determining step comprises the steps of:
    detecting an occurrence of a signal loss from the modem at the central office; and
    communicating the occurrence of the signal loss to the modem.

2. The method of claim 1 wherein the detecting step comprises the steps of:
  expecting a plurality of tones from the modem at the central office at a designated time; and
  recognizing an absence of the plurality of tones at the designated time.

3. The method of claim 2 wherein the plurality of tones are Fast Retrain tones.

4. The method of claim 2 wherein the plurality of tones are Initialization Sequence tones.

5. The method of claim 1 wherein the communicating step comprises the steps of:
  initiating a handshake protocol between the central office and the modem that is responsive to the occurrence of the signal loss; and
  registering in the modem that the handshake protocol is responsive to the occurrence of the signal loss.

6. The method of claim 1 wherein the entering step further comprises:
  clearing a cutback indicator on the modem, wherein the cutback indicator records that the modem is implementing at least one power cutback and is set when the modem implements the at least one power cutback.

7. The method of claim 1 further comprising:
  determining whether a cutback indicator on the modem is set, and if not,
    implementing a power cutback method on the modem to enable simultaneous use of the telephone and the modem, and
    setting the cutback indicator on the modem, wherein the cutback indicator records that the modem is implementing at least one power cutback.

8. The method of claim 1 wherein the applying step further comprises:
  determining whether the new power cutback is approximately zero, and if so,
    clearing a cutback indicator on the modem, wherein the cutback indicator records that the modem is implementing at least one power cutback and is set when the modem implements the at least one power cutback.

9. A method for recovering from a power cutback in a splitterless Asymmetric Digital Subscriber Line modem, where the power cutback enables simultaneous use of a telephone and the modem, the method comprising the steps of:
  initiating a Fast Retrain procedure;
  determining whether a flag on the modem is not set, and if so,
    performing a power cutback method on the modem to enable simultaneous use of the telephone and the modem, and
    setting a flag on the modem, wherein the flag records that the modem is implementing at least one power cutback;
  determining whether a flag on the modem is set, and if so,
    reducing the previous power cutback by a step value to obtain a new power cutback, and
    applying the new power cutback to the modem to obtain a new transmitted power;
  determining whether the new transmitted power is sufficient to complete the Fast Retrain procedure, and if so,
    initiating a handshake protocol between the central office and the modem, and
  determining whether the new transmitted power is sufficient to complete an Initialization Sequence procedure, and if so,
    entering a data transfer mode between the modem and the central office, and
    clearing the flag; and
  determining whether the new transmitted power is sufficient to complete the Fast Retrain procedure or the Initialization Sequence procedure, and if not,
    initiating a handshake protocol between the central office and the modem, and
    repeating the above steps by reinitiating the Fast Retrain procedure.

* * * * *